June 11, 1929.  G. CHISHOLM  1,716,421
SIGNALING DEVICE FOR USE UPON MOTOR ROAD VEHICLES
Filed June 26, 1928  2 Sheets-Sheet 2
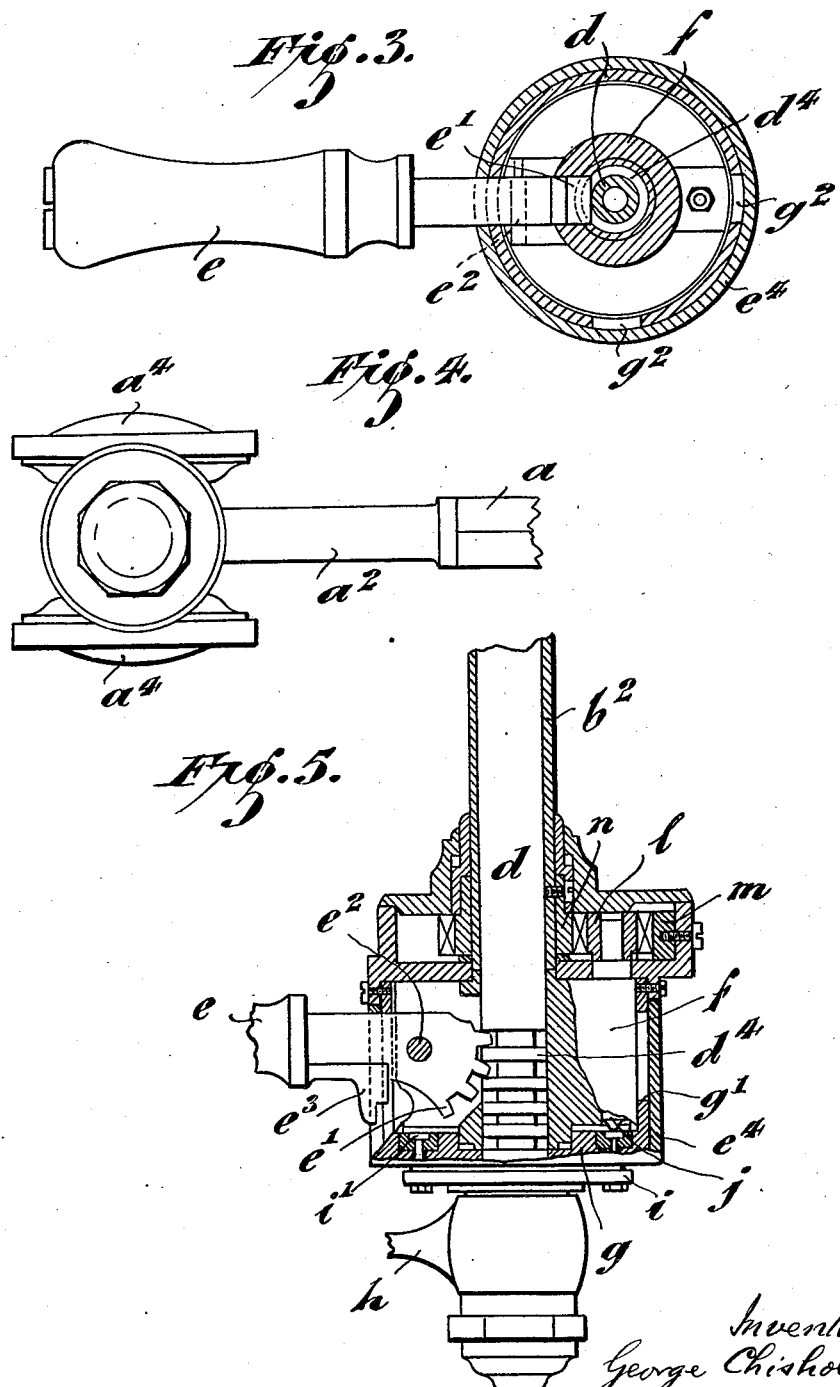

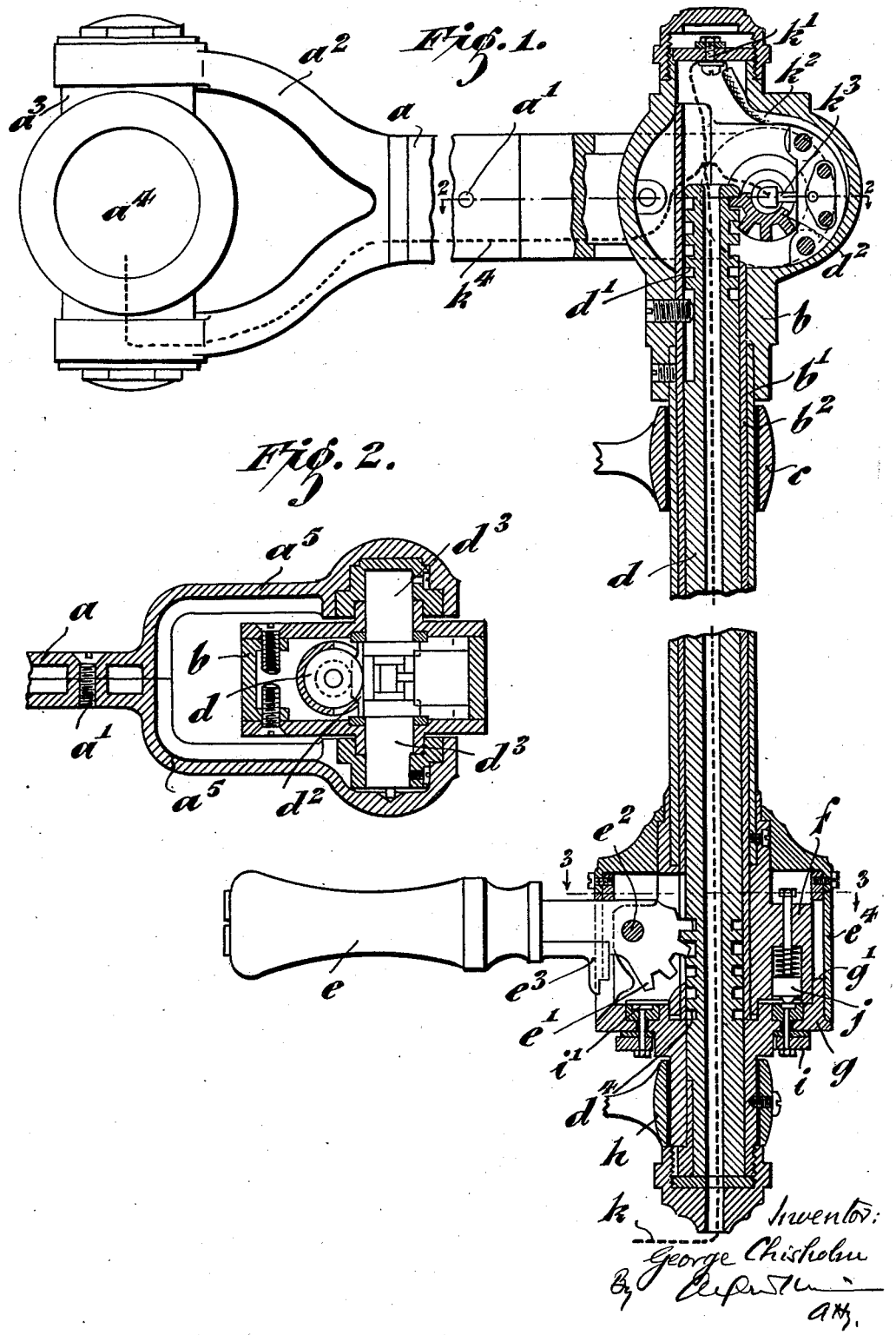

Patented June 11, 1929.

1,716,421

UNITED STATES PATENT OFFICE.

GEORGE CHISHOLM, OF JERSEY, CHANNEL ISLANDS.

SIGNALING DEVICE FOR USE UPON MOTOR ROAD VEHICLES.

Application filed June 26, 1928, Serial No. 288,353, and in Great Britain July 9, 1927.

The present invention has relation to a signaling device for use upon a motor road vehicle. Signaling devices are well known comprising an arm pivotally mounted and adapted to be swung by a suitable handle from one position to another to indicate the direction, but such devices have been deficient inasmuch as they have only been capable of indicating a simple left or right hand turn, and perhaps a "stop", and have invariably by their particular mounting means been obscured from the view of certain interested persons, such as rearward drivers of vehicles, disposed slightly obliquely, and certain forward drivers who may be disposed obliquely or angularly.

The present invention has for its object to provide a signaling device in the nature of a pivotal arm which will not only indicate simple left and right hand turns and a "stop", but will indicate a slowing-down motion, a desire for a rearward vehicle to overtake, in fact, give any signal according to the well known and authorized practice of moving the human arm, indicating the actions of the driver either by day or by night.

Further, the present apparatus is always readily visible to any person interested, and can not become obscured at any angle, is adapted to be illuminated in its substantial entirety by night as well as by a terminal lamp, so that the entire movements of the arm can be readily detected.

According to the present invention, the signaling arm can be mounted on an elevated part of the vehicle, as for instance, the top of a closed car, so as to be capable of being swung through at least 170°, preferably 180° in a horizontal plane, that is to say, be capable of pointing rearwardly or laterally left or right, and is also adapted to be moved into a vertical position for indicating a "stop" as well as being capable of an oscillatory movement in a vertical plane, for indicating a "slow-down", or an oscillatory movement in a horizontal plane for indicating an "overtake", the entire operation of the arm preferably being operable by the suitable manipulation of a single handle member. The arm may be positively maintained in a horizontal plane during its circumferential swinging of 180°, whereas when directed laterally to the left or right of the vehicle, it may be capable of a plain oscillation in a vertical plane, after the manner of a human arm, for indicating a "slow-down". Forward and rearward oscillation indicating an "overtake" may be effected by a normal horizontal swinging plane of the arm.

Further, the arm serves the useful purpose of illuminating the roadside by its being elevated, whether pointing laterally or rearwardly.

In order that this invention may be clearly understood and readily carried into practice, reference is had to the appended explanatory sheet of drawings, upon which:—

Figure 1 is a fragmentary sectional elevation of a signaling arm mechanism constructed according to the present invention.

Figure 2 is a horizontal sectional plan taken on the line 2—2 of Figure 1.

Figure 3 is a transverse section taken on the line 3—3 of Figure 1.

Figure 4 is a plan view of the outer extremity of the arm itself.

Figure 5 is a fragmentary sectional elevation illustrating modified hand-operating means for the signaling arm.

In a convenient embodiment of the present invention, the signaling arm $a$ is comprised of two castings (see particularly Figure 2) which are clamped together by means of screws $a^1$. The outer extremity of the arm is forked in a vertical plane as at $a^2$, and carries a tubular lamp $a^3$ having lateral lights $a^4$ and a terminal or inlet (not shown) at the extreme end, as well as slits or openings adjacent the fork part $a^2$, so arranged that when an electric bulb in the lamp is illuminated, light is thrown laterally or longitudinally both along the arm and in a direction away therefrom. With respect to the last-described illumination, when the arm is pointing rearwardly of the vehicle, it may be caused to pass through a stationary glass disc (not shown) associated with the top of the vehicle. The arm $a$ is of forked formation at its operative extremity involving two limbs $a^5$. $b$ is a housing whereon the forked limbs $a^5$ of the arm are pivoted, the said housing $b$ being carried by two vertical tubes $b^1$ $b^2$ solid therewith and carried by an insulated bearing $c$. $d$ is a vertical shaft capable of a sliding operation within the tubes $b^1$ $b^2$ having a rack or teeth $d^1$ adapted to mesh with a pinion $d^2$, with a spindle $d^3$ of which are rigidly associated the limbs $a^5$ of the arm $a$. The lower part of the rod $d$ is provided with teeth $d^4$ adapted to co-operate with corresponding teeth $e^1$ on a handle member $e$ pivoted at $e^2$ to a member $f$ which is solid with the two tubes $b^1$ $b^2$ in such a manner that when the handle $e$ is swung through 180° on an axis passing centrally through the said tubes $b^1$ $b^2$ the arm $a$ is caused to be swung through a corresponding angle. $g$ is a stationary element carried by a second insulated attachment arm $h$. $e^3$ is a claw upon the handle $e$ adapted to slidably co-operate with the face $g^1$ of the member $g$, and operate when desired in slots $g^2$ of the member $g$ (see particularly Figure 3).

$e^4$ is a loose ring associated with the handle adapted to cover up the slots $g^2$ from view, the said ring $e^4$ having a master slot to permit of the operation of the handle.

In operation, it will be seen that upon seizing the handle $e$ and swinging same through 180°, a similar movement is imparted to the arm $a$. Further, on account of the slots $g^2$ and the toothed mechanism, in any of the three positions by depressing the handle $e$, the arm may be elevated or oscillated, as desired, in a vertical plane. It may, in one instance, be capable of elevation to such an extent that it points vertically for signaling "stop". $i$ is a metallic plate insulated from the adjacent metal having a plurality of contacts $i^1$. $j$ is a spring contact associated with the movable part $f$. The electric circuit is through the lead $k$ to a terminal $k^1$, thence through $k^2$ $k^3$ to leads $k^4$ conducted to the lamp, a metallic return being provided through the mechanism by way of the plunger $j$, plate $i$, and the negative pole of the battery, it being appreciated that the mechanism is insulated from the vehicle, as at $c$ and $h$.

Further, it will be understood that with the plunger and contact mechanism $j$ $i^1$ the lamp is illuminated when a selected position has been obtained, and therefore any swinging of a lighted lamp liable to cause hindrance is avoided.

In the modification illustrated in Figure 5, the arrangement is such that the handle $e$ may be moved through an angle considerably less than 180° to give a sweep of that angle to the arm $a$. This is effected by providing a pinion $l$ on the part $f$, to which the handle $e$ is pivoted, the said pinion $l$ being set in rotation by a stationary arcuate rack $m$ and gearing with a pinion $n$ provided upon the tube $b^2$ wherein the push-rod $d$ is accommodated, the tube $b^2$ in this modification being free to rotate independently of the part $f$.

In the present signaling system, therefore, there is provided a signaling arm adapted to be swung through substantially 180° in a horizontal plane, and selectively oscillated or moved in a vertical plane or mounted in an upright position, the whole operation or movement of the arm being effected from a single operating handle.

The present signaling arm can therefore give all the well-known hand signals, and when mounted on top or the upper part of a vehicle, can be readily seen by all concerned either by day or at night-time.

What I claim as my invention and desire to secure by Letters Patent is:—

An actuator for motor vehicle signaling comprising an upright support, an arm pivoted thereto, a handle pivotally connected to the lower part of said support, pinion-like members associated both with said handle and said arm, and a linking mechanism between said handle and said arm consisting of a tube and a slidable rod therein having rack-teeth in mesh with said pinion-like members, the vertical oscillation of said handle causing an oscillation of said arm in a vertical plane by means of said rack and pinion mechanism, and the horizontal oscillation of said handle causing a corresponding oscillation of said arm by means of said tube.

In witness whereof I have hereunto set my hand.

GEORGE CHISHOLM.